US011753013B2

(12) United States Patent
Reckziegel et al.

(10) Patent No.: US 11,753,013 B2
(45) Date of Patent: Sep. 12, 2023

(54) METHOD FOR OPERATING A DRIVING ASSISTANCE SYSTEM, AND DRIVING ASSISTANCE SYSTEM

(71) Applicant: Robert Bosch GmbH, Stuttgart (DE)

(72) Inventors: Bastian Reckziegel, Kirchheim/Nabern (DE); Erich Sonntag, Marbach am Neckar (DE); Gian Antonio D'Addetta, Stuttgart (DE); Johannes Ludwig Foltin, Ditzingen (DE); Sybille Eisele, Hessigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 349 days.

(21) Appl. No.: 16/848,166

(22) Filed: Apr. 14, 2020

(65) Prior Publication Data

US 2020/0339125 A1    Oct. 29, 2020

(30) Foreign Application Priority Data

Apr. 23, 2019   (DE) .......................... 102019205802.7

(51) Int. Cl.
*B60W 30/18*    (2012.01)
*B60W 60/00*    (2020.01)
*B60W 40/04*    (2006.01)

(52) U.S. Cl.
CPC ...... *B60W 30/18163* (2013.01); *B60W 40/04* (2013.01); *B60W 60/0016* (2020.02); *B60W 60/0017* (2020.02); *B60W 60/00276* (2020.02)

(58) Field of Classification Search
None
See application file for complete search history.

(56) References Cited

U.S. PATENT DOCUMENTS

| 2016/0103212 | A1* | 4/2016 | Nath | G01S 13/04 342/28 |
| 2017/0270799 | A1* | 9/2017 | Takeda | B60W 30/00 |
| 2017/0369067 | A1* | 12/2017 | Saigusa | B60W 30/16 |
| 2018/0033308 | A1* | 2/2018 | Litkouhi | G05D 1/0268 |
| 2019/0054922 | A1* | 2/2019 | Yai | B60W 10/18 |
| 2019/0311272 | A1* | 10/2019 | Kamata | B60W 50/0097 |
| 2019/0382018 | A1* | 12/2019 | Garn | B60W 60/00272 |

FOREIGN PATENT DOCUMENTS

DE    102010047411 A1    5/2011

* cited by examiner

*Primary Examiner* — James J Lee
*Assistant Examiner* — David Hatch
(74) *Attorney, Agent, or Firm* — NORTON ROSE FULBRIGHT US LLP; Gerard Messina

(57) ABSTRACT

A method for operating a driving assistance system. The method includes operating at least one sensor device in a host vehicle for monitoring the surroundings of the host vehicle; recognizing a fast-moving vehicle that is traveling in a first lane adjacent to a second lane in which the host vehicle is traveling, and determining a travel speed of the fast-moving vehicle in a travel direction of the host vehicle, based on a travel speed of the host vehicle or of a following vehicle or of a preceding vehicle, by the sensor device and by a control device; identifying a movement of the fast-moving vehicle as a passing operation of the host vehicle or of the following vehicle or of the preceding vehicle; and identifying a change in the movement of the fast-moving vehicle as an abortion of the passing operation.

11 Claims, 3 Drawing Sheets

METHOD FOR OPERATING A DRIVING ASSISTANCE SYSTEM, AND DRIVING ASSISTANCE SYSTEM

CROSS REFERENCE

The present application claims the benefit under 35 U.S.C. § 119 of German Patent Application No. DE 102019205802.7 filed on Apr. 23, 2019, which is expressly incorporated herein by reference in its entirety.

FIELD

The present invention relates to a method for operating a driving assistance system, and a driving assistance system.

BACKGROUND INFORMATION

Recent vehicle systems generally include various sensors for detecting the surroundings of a vehicle, such as cameras or radar or LIDAR systems, for example to ascertain a distance from or relative speeds with respect to other objects or road users. The ascertained data may be utilized for controlling various vehicle systems such as cruise control, brakes, or other driving assistance systems such as adaptive cruise control (ACC). For example, braking to a standstill may take place. Vehicles, lanes, signs, tunnels, or the like may be recognized in addition to objects or road users.

Common systems may likewise rely on communication options between vehicles, based on car2car communication, for example. It is also possible to utilize data of the infrastructure (for example, stationary and movable traffic monitoring systems along or above the road, such as drones). In addition, based on direct communication, sensor and position information (mobile radio information such as data of a mobile telephone in one of the vehicles involved in a situation, also oncoming traffic, for example) that has already been ascertained by other vehicles may be transmitted. Map data concerning course of the roadway, number of lanes, road category, elevation profile of the road, and other information may likewise be relied on.

Passing maneuvers, in particular on highways, may often result in critical traffic situations when the road being traveled on includes an oncoming traffic area on a second lane, and when oncoming traffic is not noticed until during the passing maneuver. However, during passing, when a vehicle following the vehicle to be passed begins to close a gap and reduces the distance from the passed vehicle, a need to suddenly pull in again may result in a more serious traffic situation and possibly faulty behavior by the involved driver (systems).

A system for setting a driving assistance recommendation is described in German Patent Application No. DE 102010047411 A1. Data of a driving sensor may be utilized for passing assistance.

SUMMARY

The present invention provides an example method for operating a driving assistance system, and an example driving assistance system.

Preferred refinements of the present invention are described herein.

In accordance with example embodiments of the present invention, a method for operating a driving assistance system, and a driving assistance system that is characterized by improved handling and recognition of an aborted passing maneuver, advantageously by another vehicle, are provided. The driving assistance system and the method may improve the merger-back-in of the passing vehicle, and in particular maintaining and creating distances between vehicles, to make it easier to merge back in.

According to the present invention, an example method for operating a driving assistance system includes operating at least one sensor device in a host vehicle for monitoring the surroundings of the host vehicle; recognizing a fast-moving vehicle that is traveling in a first lane adjacent to a second lane in which the host vehicle is traveling, and determining a travel speed of the fast-moving vehicle in a travel direction of the host vehicle, based on a travel speed of the host vehicle or a following vehicle or a preceding vehicle, by the sensor device and by a control device; identifying a movement of the fast-moving vehicle as a passing operation of the host vehicle or of the following vehicle or of the preceding vehicle; identifying a change in the movement of the fast-moving vehicle as an abortion of the passing operation.

According to one specific example embodiment of the method, after a change in the movement of the fast-moving vehicle is identified as an abortion of the passing operation, the need for merging in front of or behind the host vehicle is recognized; and the host vehicle is decelerated and a vehicle distance for the fast-moving vehicle between the host vehicle and the preceding vehicle is increased, or the host vehicle is accelerated and the vehicle distance for the fast-moving vehicle between the host vehicle and the following vehicle is increased.

The lanes may advantageously extend in parallel to one another, for example on a highway. The vehicles may be passenger vehicles, trucks, two-wheelers, or any type of vehicle that moves on the roadway (road).

The sensor devices may include sensors of various types, such as radar, cameras, LIDAR, ultrasonic, distance sensors, or others. The driving assistance system may be configured to observe a traffic situation on a highway, in an urban area, or in a tunnel with oncoming traffic, and to respond to a passing maneuver by other vehicles, in particular a fast-moving vehicle, in particular when a passing operation must be aborted. The driving assistance system may advantageously recognize travel on an express highway or a superhighway with separate lanes and then deactivate. The driving assistance system may also remain active on superhighways with two or more lanes situated in one travel direction, in order to similarly give the potentially endangered driver in the adjacent lane enough room for merging in and avoiding a collision in the event of an unforeseen situation with a wrong-way driver.

The travel speed may advantageously relate, in direction and magnitude, to the actual speed of the fast-moving vehicle with respect to the travel speed of the host vehicle, or with respect to the speed of the preceding vehicle or with respect to the speed of the following vehicle (traveling behind the host vehicle).

Upon recognition of the travel motion of the fast-moving vehicle as a passing operation, "skipping the traffic", i.e., passing multiple vehicles in one passing operation, may advantageously be recognized.

In a host vehicle equipped with the driving assistance system, the risk of accidents due to aborted or critical passing maneuvers may advantageously be reduced by using the sensor devices as surroundings sensors. The risk of accidents may also be reduced for a preceding or following vehicle, as well as for traffic that is only passively taking part in the passing operation. In addition, human error and panic responses by the involved traffic when a passing operation is aborted may be reduced due to safe merging of the fast-moving vehicle.

According to one preferred specific embodiment of the method, the control device recognizes, via the sensor device and/or with the aid of cartographic data and/or with the aid of a logic system for recognizing continuous oncoming traffic, whether a second lane in which the fast-moving vehicle is traveling is an oncoming traffic lane with respect to a first lane in which the host vehicle is traveling.

A piece of information concerning the instantaneous number of lanes and information concerning the expected or actual travel direction may be ascertained based on map data, for example.

Another option for maintaining a sufficient distance from preceding and/or following vehicles, viewed from the standpoint of the host vehicle, may be achieved with regard to a minimum distance, based on highly accurate map data (elevation profile, course of the roadway, width of the road, etc.), as the result of which hills and tight curves, for example, may be recognized in advance and thus utilized for adapting a threshold value (which may be used as a reference or trigger limit for an automatic driver intervention) for the distance. Based on the map data, a general estimate of the traffic situation, for example for the foreseeable future, may advantageously be made with regard to its criticality by the control device or an external data platform or processing unit linked by wireless communication.

According to one preferred specific embodiment of the method, the movement of the fast-moving vehicle is identified as a passing operation by ascertaining the travel speed of the fast-moving vehicle as greater than the travel speed of a vehicle to be passed.

The travel speed of the fast-moving vehicle may also be regarded as a relative speed, and for recognizing the passing operation may also be considered as the particular speed of the following or preceding vehicle (respectively traveling behind or in front of the host vehicle).

According to one preferred specific embodiment of the method, the abortion of the passing operation is identified by ascertaining a first speed gradient of the fast-moving vehicle when the first speed gradient is or becomes negative, or is or becomes zero.

According to one preferred specific embodiment of the method, the control device ascertains with the aid of the sensor device a position of the fast-moving vehicle in the travel direction relative to the host vehicle, and upon identifying the abortion of the passing operation, when the fast-moving vehicle, projected into the second lane in which the host vehicle is traveling, is situated at least one first vehicle distance in front of a front end of the host vehicle, a first distance from the preceding vehicle is measured, and the host vehicle is decelerated and the vehicle distance for the fast-moving vehicle in front of the host vehicle is increased; or when the fast-moving vehicle is situated at least one second vehicle distance behind a rear end of the host vehicle, a second distance of the following vehicle is ascertained, and the host vehicle is accelerated and the vehicle distance for the fast-moving vehicle behind the host vehicle is increased.

According to one preferred specific embodiment of the method, the first vehicle distance from a front end of the fast-moving vehicle or from a rear end of the fast-moving vehicle and/or the second vehicle distance encompass(es) one-third or two-thirds, or more than three-thirds of a length of the fast-moving vehicle.

According to one preferred specific embodiment of the method, based on a movement of the fast-moving vehicle perpendicular to the travel direction of the host vehicle and based on the travel speed of the host vehicle, a magnitude of a second speed gradient for decelerating or accelerating the host vehicle is ascertained by the control device.

The movement perpendicular to the travel direction may correspond, at least partially or completely, to a lane change. The second speed gradient may correspond to the deceleration or acceleration of the host vehicle that may be necessary for providing a sufficient distance from the host vehicle to the preceding or following vehicle.

According to one preferred specific embodiment of the method, a wireless communication takes place between the control device and the fast-moving vehicle and/or the following vehicle and/or the preceding vehicle.

According to the present invention, an example driving assistance system for a host vehicle includes at least one sensor device in the host vehicle that is configured to monitor the surroundings of the host vehicle; a control device in the host vehicle that is connected to the sensor device and is configured to recognize a fast-moving vehicle that is traveling in a first lane adjacent to a second lane in which the host vehicle is traveling, and to determine a travel speed of the fast-moving vehicle in the travel direction of the host vehicle, relative to a travel speed of the host vehicle or a following vehicle or a preceding vehicle, by the sensor device and by the control device, and to identify a movement of the fast-moving vehicle as a passing operation of the host vehicle or of the following vehicle or of the preceding vehicle, and based on a change in the movement of the fast-moving vehicle, to identify an abortion of the passing operation and recognize the need for merging in front of or behind the host vehicle, and to decelerate the host vehicle and increase a vehicle gap for the fast-moving vehicle between the host vehicle and the preceding vehicle, or to accelerate the host vehicle and increase a vehicle gap for the fast-moving vehicle between the host vehicle and the following vehicle.

According to one preferred specific embodiment of the driving assistance system, the driving assistance system includes a communication device in the host vehicle for communicating with the fast-moving vehicle and/or with the preceding vehicle and/or with the following vehicle and/or with a data platform.

Accordingly, the driving assistance system may also communicate via a cloud. For example, the vehicle (one or all) may communicate with the cloud, which may subsequently communicate with the other vehicles via mobile radio.

Further features and advantages of specific embodiments of the present invention result from the following description, with reference to the figures.

BRIEF DESCRIPTION OF THE DRAWINGS

The present invention is explained in greater detail below with reference to the exemplary embodiment depicted in the figures.

Identical or functionally equivalent elements are denoted by the same reference numerals in the figures.

DETAILED DESCRIPTION OF EXAMPLE EMBODIMENTS

Figure 1:
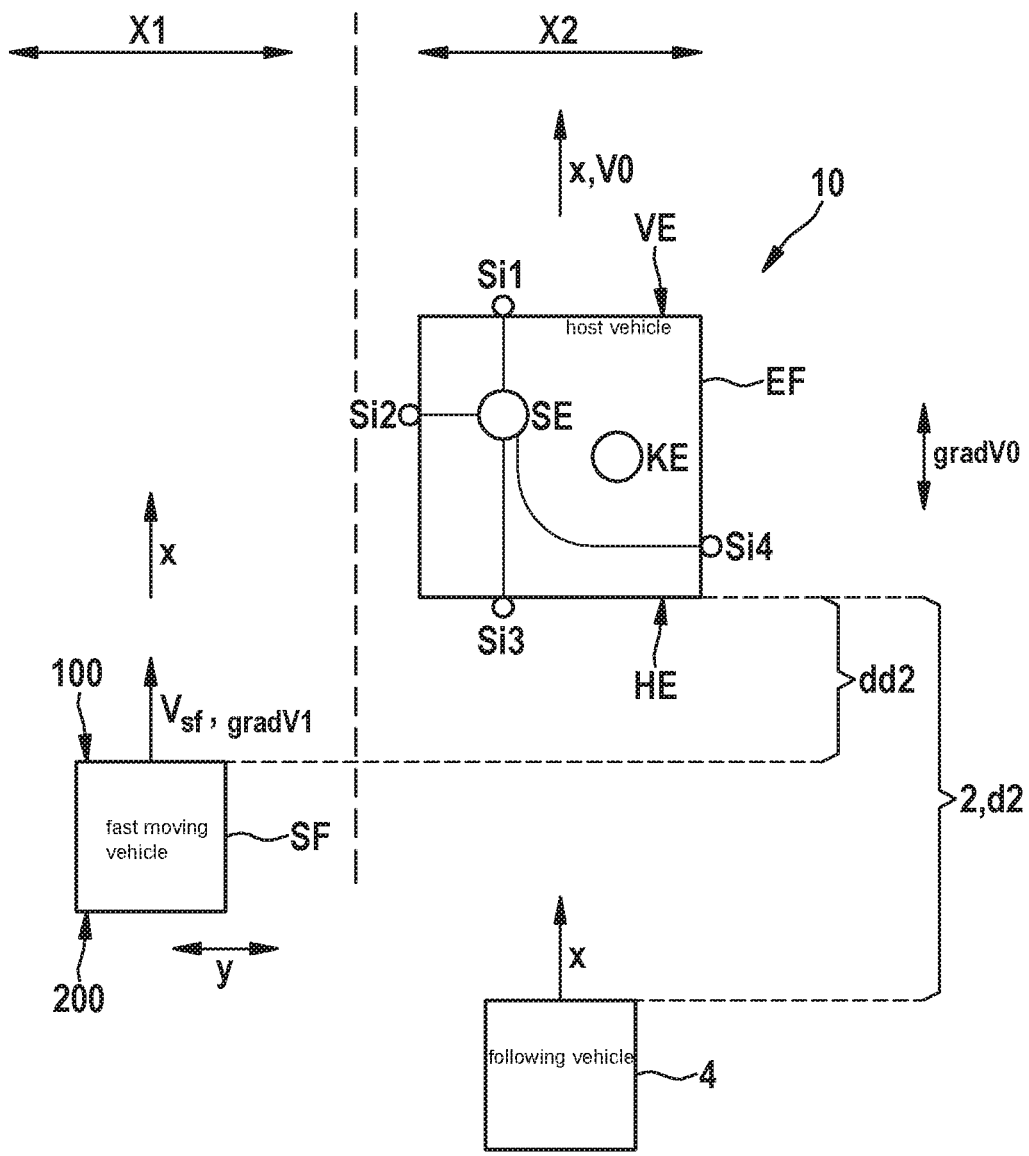
FIG. 1 shows a schematic illustration of a driving assistance system according to one exemplary embodiment of the present invention.

FIG. 1 shows a schematic illustration of a driving assistance system according to one exemplary embodiment of the present invention.

Driving assistance system 10 includes at least one sensor device Si1(Si2; . . . ; Sin) in host vehicle EF, which is configured to monitor the surroundings of host vehicle EF; and also includes a control device SE in host vehicle EF that is connected to sensor device (Si1; . . . ; Sin) and is configured to recognize a fast-moving vehicle SF that is traveling in a first lane X1 adjacent to a second lane X2 in which host vehicle EF is traveling, and to determine a travel speed Vsf of fast-moving vehicle SF in travel direction x of host vehicle EF, relative to a travel speed V0 of host vehicle EF or a following vehicle 4 or a preceding vehicle, by sensor device (Si1; . . . ; Sin) and by control device SE, and to identify a movement of fast-moving vehicle SF as a passing operation of host vehicle EF or of following vehicle 4 or of the preceding vehicle (not shown in FIG. 1), and based on a change in the movement of fast-moving vehicle SF, to identify an abortion of the passing operation and recognize the need for merging in front of or behind host vehicle EF, and to advantageously automatically decelerate host vehicle EF by control device SE and increase a vehicle gap for fast-moving vehicle SF between host vehicle EF and the preceding vehicle (not shown in FIG. 1), or to advantageously automatically accelerate host vehicle EF by control device SE and increase a vehicle gap 2 for fast-moving vehicle SF between host vehicle EF and following vehicle 4. The consideration of the speeds may also relate to the following vehicle or the preceding vehicle.

In addition to travel speed Vsf, first speed gradient grad V1 of fast-moving vehicle SF may be ascertained and observed over time. The movement of fast-moving vehicle SF may be identified as a passing operation when travel speed Vsf of fast-moving vehicle SF may be ascertained as greater than travel speed V0.

In addition, for more accurate analysis of the passing operation, the passing operation may be identified when the relative speed abruptly decreases within a characteristic time period and advantageously suddenly becomes less than the travel speed of the host vehicle or of the vehicle being passed. Additionally or alternatively, even a negative change, i.e., a reduction, in first speed gradient grad V1 may be used as an indicator for the abortion of the passing operation. The system, in particular the control device, may register the indicators for the abortion of the passing operation as a higher danger level relative to normal driving or noncritical passing (without deceleration of the fast-moving vehicle while passing).

Control device SE may ascertain a position of fast-moving vehicle SF in travel direction x relative to host vehicle EF with the aid of sensor device (Si1; . . . ; Sin), and upon identifying the abortion of the passing operation, when fast-moving vehicle SF, projected into second lane X2 in which host vehicle EF is traveling, is situated at least one second vehicle distance dd2 behind a rear end HE of host vehicle EF, a second distance d2 from following vehicle 4 is ascertained, and host vehicle EF is accelerated and vehicle distance 2 for fast-moving vehicle SF behind host vehicle EF is increased.

Similarly, a braking operation of host vehicle EF may take place when the fast-moving vehicle is situated in front of front end VE of the host vehicle and must merge with regard to a preceding vehicle.

The first vehicle distance from a front end 100 of the fast-moving vehicle or from a rear end 200 of the fast-moving vehicle and/or second vehicle distance dd2 may encompass one-third or two-thirds, or more than three-thirds of a length of fast-moving vehicle SF.

Based on a movement y of fast-moving vehicle SF perpendicular to travel direction x, for example a lane change, a beginning lane change, or at least one indicated movement in the y direction, and based on travel speed V0 of host vehicle EF, a magnitude of a second speed gradient gradV0 for a deceleration or acceleration of host vehicle EF, may be ascertained by control device SE in order to facilitate a merger of fast-moving vehicle SF.

For determining the distances, speeds, and directional movements, the sensor devices may also be advantageously assisted by wireless communication between control device SE and fast-moving vehicle SF and/or following vehicle 4 and/or preceding vehicle 3, and may also utilize the sensor system of the control device or at least request its utilization.

In addition, it may also be possible to recognize the abortion of the passing operation when the travel speed or relative speed or the first speed gradient exceeds or falls below a limiting value. In this way it may be advantageously differentiated whether or not the fast-moving vehicle and/or the host vehicle or the vehicle to be passed are/is traveling in a column of vehicles.

Furthermore, an evaluation of the activity of the brake lights or taillights (also headlights) on the fast-moving vehicle and/or on the preceding or following vehicle may take place, and the position and passing behavior of the fast-moving vehicle relative to the host vehicle and relative to the other traffic may be observed and estimated. Based on the brake lights or taillights, it is also possible to ascertain the number of lanes having an association of the vehicles with the lanes, in order to distinguish the abortion of a passing operation from a column of vehicles.

In addition, it is possible that the vehicle distance for the fast-moving vehicle may be estimated and maintained by observing rear end 200 of fast-moving vehicle SF, for example that the fast-moving vehicle may always be situated in front of front end VE of the host vehicle, and therefore merging may be possible at all times. In addition, a safety distance (for possible merging) that is adapted to the particular speed may also be taken into account.

Increasing vehicle distance 2 may advantageously be started by host vehicle EF immediately after the abortion of the passing maneuver is recognized, even if the fast-moving vehicle is still traveling in the second lane. Based on the travel speed or relative speed, it may be deduced when fast-moving vehicle SF must merge. The magnitude of vehicle distance 2 to be created may differ, for example, in that a previously measured length of fast-moving vehicle SF (measured during passing of the host vehicle or another vehicle, or transmitted from the fast-moving vehicle itself) may be taken into account, or a fixed standard length, a model-based standard length (for example, as a function of the vehicle type, presence of a trailer), and/or a mixed form thereof may be taken into account. The advantage may lie in the early reaction by the host vehicle and a response (greater comfort for the driver and a lower risk for the other traffic may thus be achieved). Due to the early recognition of the need for merging, the necessity for strongly decelerating host vehicle EF may be reduced, compared to not recognizing the abortion of the passing maneuver until a later point in time. In this way, a response time of the system to the abortion may be advantageously increased, but as a precaution, even without recognizing the abortion, vehicle distance 2 may be increased, advantageously to a length of the fast-moving vehicle and a safety distance.

The control based on rear end 200 of the fast-moving vehicle may similarly also take place based on front end 100 and an acceleration of the host vehicle, and may be combined with other observation variants of the traffic, for example with the above-mentioned maintenance (characteristic) of vehicle distance 2 immediately upon recognizing the abortion. This may have the advantageous result that for an incorrectly recognized abortion, a response by the host vehicle may be significantly less (the control of the distance and of the acceleration or braking), which the driver preferably does not perceive. Sensitively set systems (with an increased faulty detection rate) may thus respond more often in a critical case without the driver being greatly disturbed in a noncritical case.

Figure 2:
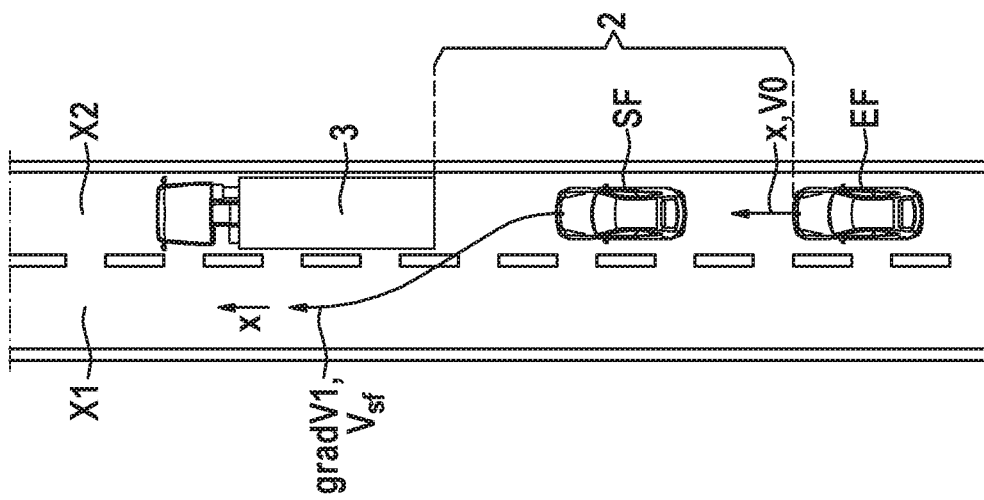
FIG. 2 shows a schematic illustration of a traffic situation with a host vehicle that includes and operates a driving assistance system according to one exemplary embodiment of the present invention.

FIG. 2 shows a schematic illustration of a traffic situation with a host vehicle that includes and operates a driving assistance system according to one exemplary embodiment of the present invention.

A vehicle that is traveling on a road may include a driving assistance system according to the present invention, and in the following discussion is referred to as a host vehicle EF.

The traffic situation in FIG. 2 shows a fast-moving vehicle SF that is still moving in second lane X2, the same as host vehicle EF and preceding vehicle 3, and in particular is moving between same. For passing, the fast-moving vehicle may accelerate and may have a positive first speed gradient gradV1, and may change to first lane X1; it may then have a positive relative speed Vrel with respect to travel speed V0 of the host vehicle, likewise with respect to the speed of the preceding vehicle. Host vehicle EF and fast-moving vehicle SF have a movement in travel direction x.

Figure 3B:
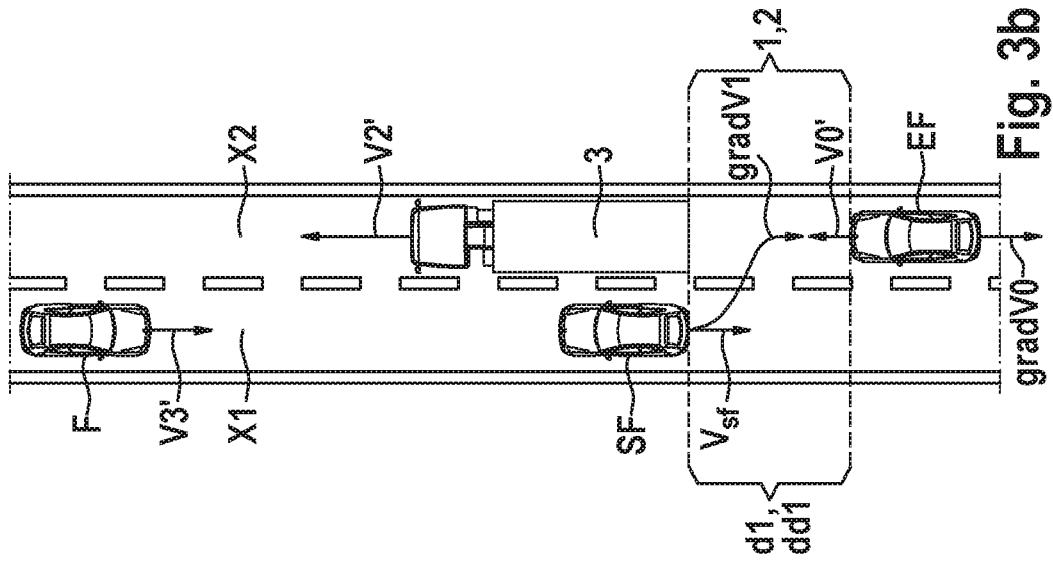
FIG. 3b shows a schematic process sequence of a method according to another exemplary embodiment of the present invention, based on a traffic situation.
Figure 3A:
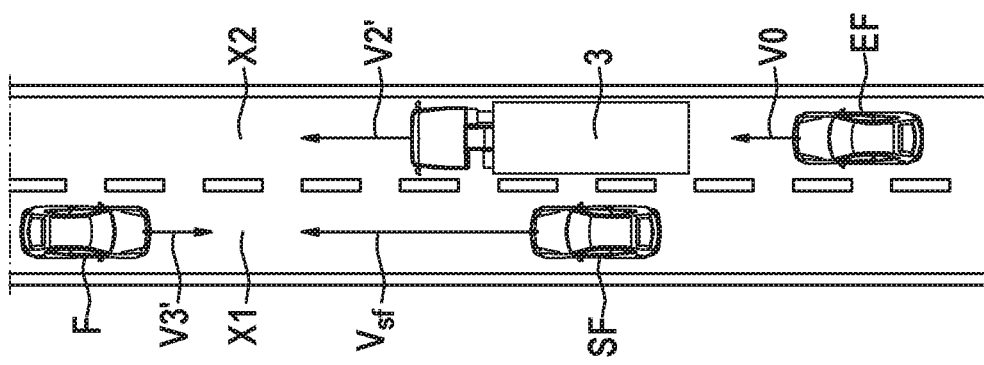
FIG. 3a shows a schematic process sequence of a method according to one exemplary embodiment of the present invention, based on a traffic situation.

FIG. 3a shows a schematic process sequence of a method according to one exemplary embodiment of the present invention, based on a traffic situation.

The traffic situation in FIG. 3a may follow that in FIG. 2.

The movement of fast-moving vehicle SF may be identified as a passing operation when travel speed Vre1 of fast-moving vehicle SF may be ascertained as greater than speed V2' of preceding vehicle 3, advantageously when the fast-moving vehicle is situated, at least in areas, next to the preceding vehicle or next to a following vehicle.

For improved estimation of the traffic situation, it is also possible to ascertain a speed or a movement, for example also the distance of an oncoming vehicle F from fast-moving vehicle SF during the passing operation, and to estimate the passing or merging behavior of fast-moving vehicle SF. The movement of oncoming vehicle F may take place, for example, via communication between the vehicles, for example since fast-moving vehicle SF itself may also measure and transmit the data concerning oncoming vehicle F. A measurement of movements of the oncoming traffic may advantageously be dispensed with, but may also additionally take place.

In addition to travel speed Vsf, first speed gradient gradV1 of fast-moving vehicle SF may be ascertained and observed over time. The movement of the fast-moving vehicle may be ascertained as a passing operation of preceding vehicle 3 when first speed gradient gradV1 is positive or at least zero.

FIG. 3b shows a schematic process sequence of a method according to another exemplary embodiment of the present invention, based on a traffic situation.

The traffic situation in FIG. 3b shows a follow-up situation from FIG. 3a, when fast-moving vehicle SF is forced to abort the passing operation and must merge behind preceding vehicle 3 and in front of host vehicle EF.

Control device SE with the aid of sensor device (Si1; . . . ; Sin) may ascertain a position of fast-moving vehicle SF in travel direction x relative to host vehicle EF, and upon identifying the abortion of the passing operation, when fast-moving vehicle SF, projected into second lane X2 in which host vehicle EF is traveling, is situated at least one first vehicle distance dd1 in front of a front end VE of host vehicle EF, a first distance d1 from preceding vehicle 3 may be measured, and vehicle distance 2 for fast-moving vehicle SF in front of host vehicle EF may be increased so that the fast-moving vehicle may pull in. It is also possible to consider speed Vsf of the fast-moving vehicle as a relative speed with respect to other vehicles.

An abortion of the passing operation may be identified by ascertaining a first speed gradient gradV1 of fast-moving vehicle SF when first speed gradient gradV1 is zero or negative.

Figure 4:
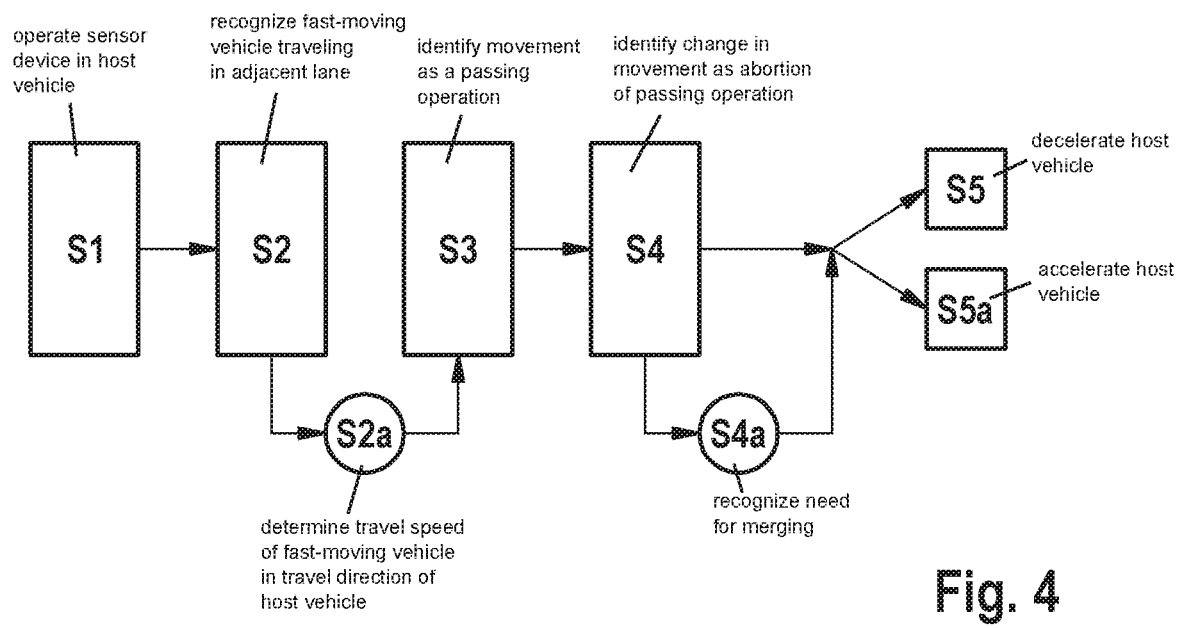
FIG. 4 shows a schematic block diagram of method steps of a method according to one exemplary embodiment of the present invention.

FIG. 4 shows a schematic block diagram of method steps of a method according to one exemplary embodiment of the present invention.

The method for operating a driving assistance system includes operating S1 at least one sensor device in a host vehicle for monitoring the surroundings of the host vehicle; recognizing S2 a fast-moving vehicle that is traveling in a first lane adjacent to a second lane in which the host vehicle is traveling, and determining S2a a travel speed of the fast-moving vehicle in the travel direction of the host vehicle, based on a travel speed of the host vehicle or a following vehicle or a preceding vehicle, by the sensor device and by a control device; identifying S3 a movement of the fast-moving vehicle as a passing operation of the host vehicle or of the following vehicle or of the preceding vehicle; identifying S4 a change in the movement of the fast-moving vehicle as an abortion of the passing operation and recognizing S4a the need for merging in front of or behind the host vehicle; and decelerating S5 the host vehicle and increasing a vehicle distance for the fast-moving vehicle between the host vehicle and the preceding vehicle, or accelerating S5a the host vehicle and increasing the vehicle distance for the fast-moving vehicle between the host vehicle and the following vehicle.

Although the present invention has been described above with reference to the preferred exemplary embodiment, it is not limited thereto, and may be modified in numerous ways.

What is claimed is:

1. A method for operating a driving assistance system, the method comprising:
 operating at least one sensor device in a host vehicle to monitor surroundings of the host vehicle;
 recognizing a moving vehicle that is traveling in a first lane adjacent to a second lane in which the host vehicle is traveling, and determining a travel speed of the moving vehicle in a travel direction of the host vehicle, by the sensor device and by a control device, based on a travel speed of the host vehicle or of a following vehicle or of a preceding vehicle;

identifying a movement of the moving vehicle as a passing operation, by the moving vehicle, of the host vehicle or of the following vehicle or of the preceding vehicle;

identifying a change in the movement of the moving vehicle as a terminating of the passing operation;

recognizing, after the change in the movement of the moving vehicle is identified as the terminating of the passing operation, a need for the moving vehicle to merge in front of or behind the host vehicle; and performing one of: (i) decelerating the host vehicle and increasing a vehicle distance between the host vehicle and the preceding vehicle, or (ii) accelerating the host vehicle and increasing the vehicle distance between the host vehicle and the following vehicle;

wherein the passing operation is identified when a relative speed of the host vehicle with respect to an object or a road user decreases within a time period and a vehicle speed of the moving vehicle becomes less than the travel speed of the host vehicle or of the vehicle being passed, and wherein a negative change or a reduction in a first speed gradient is used as an indicator for the terminating of the passing operation, wherein based on a perpendicular movement of the moving vehicle perpendicular to the travel direction of the host vehicle and based on the travel speed of the host vehicle, a magnitude of a second speed gradient for decelerating or accelerating the host vehicle is ascertained by the control device, and wherein an activity of brake lights, taillights, and/or headlights on the moving vehicle and/or on the preceding or following vehicle is evaluated, and the position and passing behavior of the moving vehicle relative to the host vehicle and relative to the other traffic is observed and estimated, and wherein based on the brake lights and/or taillights, a number of lanes having an association of the vehicles with the lanes is ascertained to distinguish the terminating of the passing operation from a column of vehicles.

2. The method as recited in claim 1, further comprising:
recognizing, by the control device using the sensor device and/or using cartographic data, whether the first lane is an oncoming traffic lane with respect to the second lane.

3. The method as recited in claim 1, wherein the movement of the moving vehicle is identified as a passing operation by ascertaining the travel speed of the moving vehicle as greater than the travel speed of a vehicle to be passed.

4. The method as recited in claim 1, wherein the terminating of the passing operation is identified by ascertaining a first speed gradient of the moving vehicle when the first speed gradient is negative or is equal to zero.

5. A method for operating a driving assistance system, the method comprising:

operating at least one sensor device in a host vehicle to monitor surroundings of the host vehicle;

recognizing a moving vehicle that is traveling in a first lane adjacent to a second lane in which the host vehicle is traveling, and determining a travel speed of the moving vehicle in a travel direction of the host vehicle, by the sensor device and by a control device, based on a travel speed of the host vehicle or of a following vehicle or of a preceding vehicle;

identifying a movement of the moving vehicle as a passing operation, by the moving vehicle, of the host vehicle or of the following vehicle or of the preceding vehicle;

identifying a change in the movement of the moving vehicle as a terminating of the passing operation; and ascertaining, by the control device using the sensor device, a position of the moving vehicle in the travel direction relative to the host vehicle, and upon identifying the terminating of the passing operation, when the moving vehicle, projected into the second lane in which the host vehicle is traveling is:

(i) situated at least one first vehicle distance in front of a front end of the host vehicle, a first distance from the preceding vehicle is measured, and the host vehicle is decelerated and the vehicle distance for the moving vehicle in front of the host vehicle is increased; or (ii) situated at least one second vehicle distance behind a rear end of the host vehicle, a second distance of the following vehicle is ascertained, and the host vehicle is accelerated and the vehicle distance for the moving vehicle behind the host vehicle is increased;

wherein the passing operation is identified when a relative speed of the host vehicle with respect to an object or a road user decreases within a time period and a vehicle speed of the moving vehicle becomes less than the travel speed of the host vehicle or of the vehicle being passed, and wherein a negative change or a reduction in a first speed gradient grad is used as an indicator for the terminating of the passing operation, and wherein based on a perpendicular movement of the moving vehicle perpendicular to the travel direction of the host vehicle and based on the travel speed of the host vehicle, a magnitude of a second speed gradient for decelerating or accelerating the host vehicle is ascertained by the control device, and wherein an activity of brake lights, taillights, and/or headlights on the moving vehicle and/or on the preceding or following vehicle is evaluated, and the position and passing behavior of the moving vehicle relative to the host vehicle and relative to the other traffic is observed and estimated, and wherein based on the brake lights and/or taillights, a number of lanes having an association of the vehicles with the lanes is ascertained to distinguish the terminating of the passing operation from a column of vehicles.

6. The method as recited in claim 5, wherein the first vehicle distance from a front end of the moving vehicle or from a rear end of the moving vehicle and/or the second vehicle distance, is at least one-third a length of the moving vehicle.

7. The method as recited in claim 6, wherein the first vehicle distance and/or the second vehicle distance is at least two-thirds the length of the moving vehicle.

8. The method as recited in claim 6, wherein the first vehicle distance and/or the second vehicle distance is at least the length of the moving vehicle.

9. The method as recited in claim 1, wherein wireless communication takes place between the control device and the moving vehicle and/or the following vehicle and/or the preceding vehicle.

10. A driving assistance system for a host vehicle, comprising:

at least one sensor device situated in the host vehicle and configured to monitor surroundings of the host vehicle;

a control device situated in the host vehicle and connected to the sensor device, the control device being configured to recognize a moving vehicle that is traveling in a first lane adjacent to a second lane in which the host vehicle is traveling, and to determine a travel speed of the moving vehicle in the travel direction of the host vehicle, relative to a travel speed of the host vehicle or of a following vehicle or of a preceding vehicle, using the sensor device, and to identify a movement of the moving vehicle as a passing operation by the moving vehicle of the host vehicle or of the following vehicle or of the preceding vehicle, and based on a change in the movement of the moving vehicle, to identify a terminating of the passing operation and recognize a need for the moving vehicle to merge in front of or behind the host vehicle and to: (i) decelerate the host vehicle and increase a vehicle gap for the moving vehicle between the host vehicle and the preceding vehicle, or (ii) accelerate the host vehicle and increase a vehicle gap for the moving vehicle between the host vehicle and the following vehicle;

wherein the passing operation is identified when a relative speed of the host vehicle with respect to an object or a road user decreases within a time period and a vehicle speed of the moving vehicle becomes less than the travel speed of the host vehicle or of the vehicle being passed, and wherein a negative change or a reduction in a first speed gradient grad is used as an indicator for the terminating of the passing operation, and wherein based on a perpendicular movement of the moving vehicle perpendicular to the travel direction of the host vehicle and based on the travel speed of the host vehicle, a magnitude of a second speed gradient for decelerating or accelerating the host vehicle is ascertained by the control device, and wherein an activity of brake lights, taillights, and/or headlights on the moving vehicle and/or on the preceding or following vehicle is evaluated, and the position and passing behavior of the moving vehicle relative to the host vehicle and relative to the other traffic is observed and estimated, and wherein based on the brake lights and/or taillights, a number of lanes having an association of the vehicles with the lanes is ascertained to distinguish the terminating of the passing operation from a column of vehicles.

11. The driving assistance system as recited in claim 2, further comprising: a communication device in the host vehicle configured to communicate with the moving vehicle and/or the preceding vehicle and/or the following vehicle and/or a data platform.

* * * * *